(12) United States Patent
Isono (10) Patent No.: US 7,474,479 B2
(45) Date of Patent: Jan. 6, 2009

(54) IMAGE PICKUP LENS SYSTEM (75) Inventor: Masashi Isono, Hoi-gun (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 614 days.

(21) Appl. No.: 10/999,565

(22) Filed: Nov. 29, 2004

(65) Prior Publication Data
US 2005/0117047 A1 Jun. 2, 2005

(30) Foreign Application Priority Data
Dec. 2, 2003 (JP) ............................. 2003-402408

(51) Int. Cl.
G02B 9/34 (2006.01)
(52) U.S. Cl. ..................................... 359/779
(58) Field of Classification Search ................. 359/754, 359/771, 779
See application file for complete search history.

(56) References Cited

U.S. PATENT DOCUMENTS

| 5,739,966 | A | * | 4/1998 | Tanaka | 359/779 |
| 6,414,802 | B1 | | 7/2002 | Betensky | 359/753 |
| 6,813,099 | B2 | * | 11/2004 | Yamaguchi | 359/779 |
| 2003/0117721 | A1 | | 6/2003 | Kondo et al. | 359/751 |
| 2004/0125468 | A1 | | 7/2004 | Do | 359/781 |

* cited by examiner

Primary Examiner—David L Ometz
Assistant Examiner—Dillon Durnford-Geszvain
(74) Attorney, Agent, or Firm—Sidley Austin LLP (57) ABSTRACT

An image pickup lens system has a four-lens configuration which forms an image on a solid-state image pickup device. The image pickup lens system includes, from an object side, a positive first lens, an aperture stop, a positive second lens, a negative third lens whose concave surface is faced toward an image surface side, and a positive fourth lens in the order from an object side. A ratio of an axial lens thickness of the third lens to a focal length of the whole system is optimally set. Therefore, an exit pupil position can be kept far away from the image surface while the image pickup lens system has good optical performance and a compact size.

18 Claims, 10 Drawing Sheets

FIG.7A — Spherical Aberration Sine Condition
FIG.7B — Astigmatism
FIG.7C — Distortion

FIG.8A  FIG.8B  FIG.8C

Spherical Aberration
Sine Condition

FIG.9A

Astigmatism

FIG.9B

Distortion

FIG.9C

FIG.10A — Spherical Aberration Sine Condition

FIG.10B — Astigmatism

FIG.10C — Distortion

IMAGE PICKUP LENS SYSTEM

The present application claims priority to Japanese Patent Application No. 2003-402408 filed Dec. 2, 2003, the entire content of which is hereby incorporated by reference.

BACKGROUND OF THE INVENTION

1. Field of the Invention

The present invention relates to an image pickup lens system. More particularly the invention relates to the high-performance and compact image pickup lens system suitable for digital input equipment such as a digital still camera and a digital video camera which captures an image of a subject with a solid-state image pickup device.

2. Description of the Related Art

Recently, as personal computers become widespread, digital still cameras and digital video cameras (hereinafter referred simply to as "digital camera") which can easily capture image information in the digital equipment become widespread in a personal user level. It is expected that such digital cameras become wide spread more and more in the future as input equipments for image information.

Miniaturization of a solid-state image pickup device such as CCD (Charge Coupled Device) which is mounted on the digital camera is also proceeding, and further miniaturization of the digital camera is required as the solid-state image pickup device is miniaturized. Therefore, the miniaturization is also strongly demanded in the image pickup lens system which occupies the largest capacity in the digital input equipment. In order to miniaturize the image pickup lens system, the easiest method is to decrease a size of the solid-state image pickup device. However, in order to decrease a size of the solid-state image pickup device, it is necessary to decrease the size of a photodetector, so that performance required for the image pickup lens system is increased while the degree of difficulty in producing the solid-state image pickup device.

On the other hand, when the size of the image pickup lens system is decreased while the size of the solid-state image pickup device remains, an exit pupil position is necessarily caused to be near to an image surface. When the exit pupil position is caused to be near to the image surface, an off-axis luminous flux outgoing from the image pickup lens system is obliquely incident to the image surface, so that a micro lens provided in front of the solid-state image pickup device does not sufficiently exert focusing performance. This results in a problem that brightness of the image is changed between a central portion of the image and a peripheral portion of the image. When the exit pupil position of the image pickup lens system is kept far away from the image surface in order to solve the problem, upsizing of the whole image pickup lens system can not be avoided.

Because of low-price competition in recent years, cost reduction is also strongly demanded of the image pickup lens system. Further, the higher performance is also required for the image pickup lens system due to recent integration of the solid-state image pickup device. For the above-described demands, the image pickup lens system for the solid-state image pickup device having a four-lens configuration has been proposed in Patent References (U.S. Pat. No. 6,414,802, US2003/117,721, and US2004/125,468).

However, the image pickup lens systems described in these Patent References include four lenses and the first lens is the negative lens, so that a total length of the lens is increased and the image pickup lens system lacks compactness.

SUMMARY OF THE INVENTION

A main object of the invention is to provide the image pickup lens system for solid-state image pickup device in which the exit pupil position is kept far away from the image surface while the image pickup lens system has good optical performance and the compact size.

In order to achieve the above-described object and other objects, in an aspect of the invention, an image pickup lens system includes, from an object side, a positive first lens, an aperture stop, a positive second lens, a negative third lens whose concave surface is faced toward an image surface side, and a positive fourth lens, and the image pickup lens system satisfies the following conditional expression (1):

$$0.05 < T3/f < 0.5 \qquad (1)$$

where T3 is an axial thickness of the third lens and f is a focal length of a whole system.

In accordance with the invention, the image pickup lens system for solid-state image pickup device in which the exit pupil position is kept far away from the image surface while the image pickup lens system has good optical performance and the compact size can be realized. When the image pickup lens system according to the invention is used for the digital input equipment such as the camera built in the cellular phone and the digital camera, the image pickup lens system can contribute to the high performance, the high functionality, the cost reduction, and the miniaturization in the digital input equipment.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENTS

Figure 1:
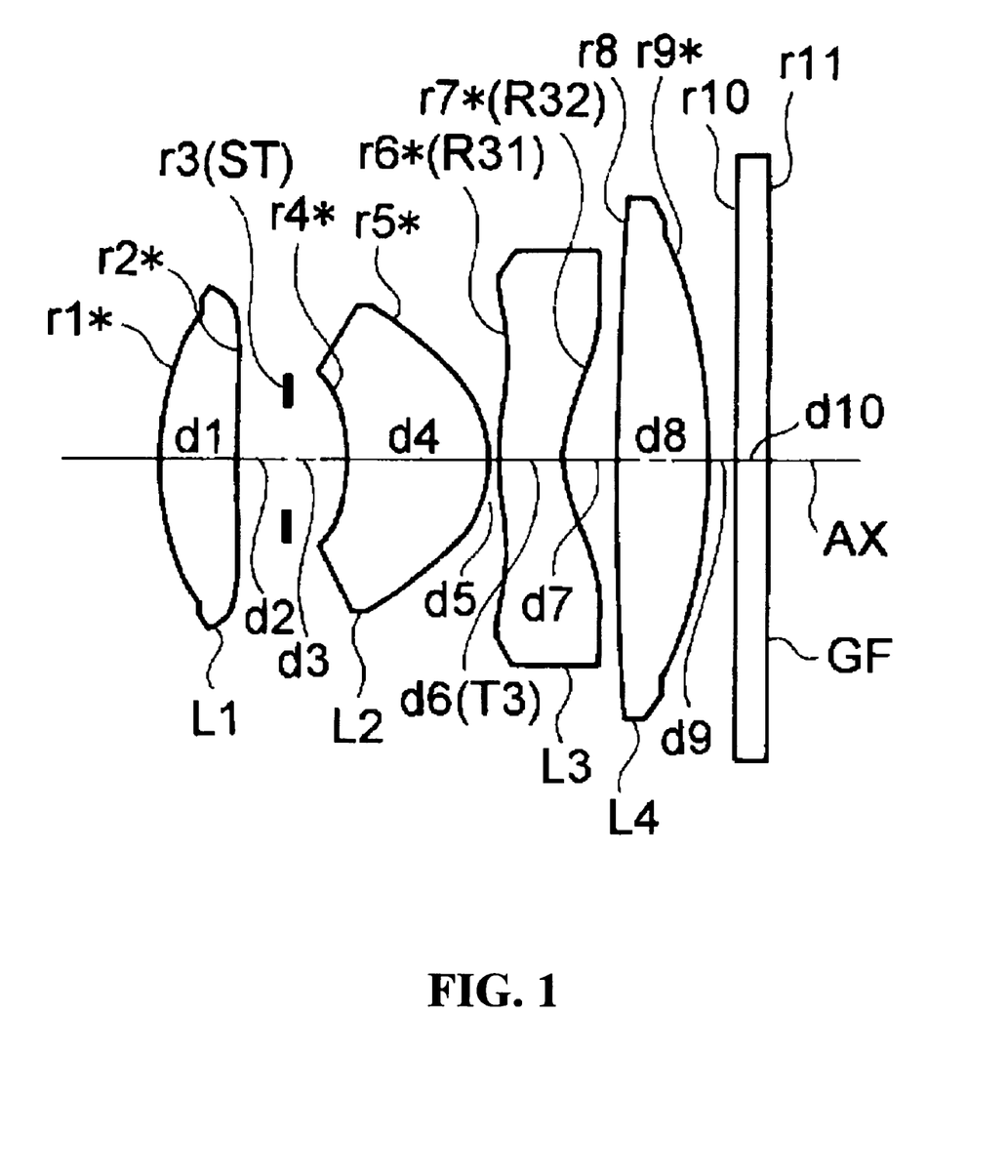
FIG. 1 is a lens configuration view of a first embodiment (example 1)
Figure 2:
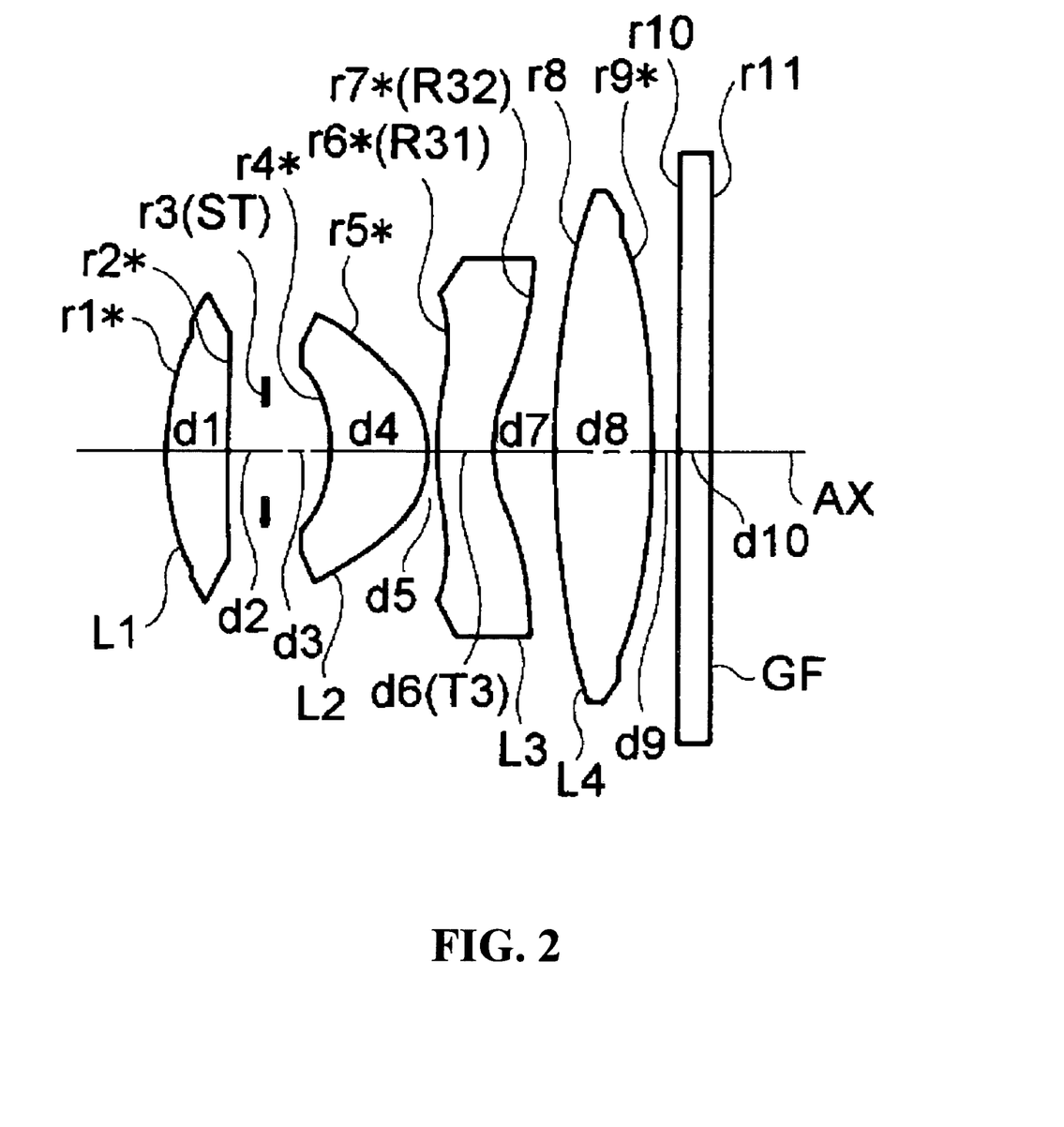
FIG. 2 is a lens configuration view of a second embodiment (example 2)
Figure 3:
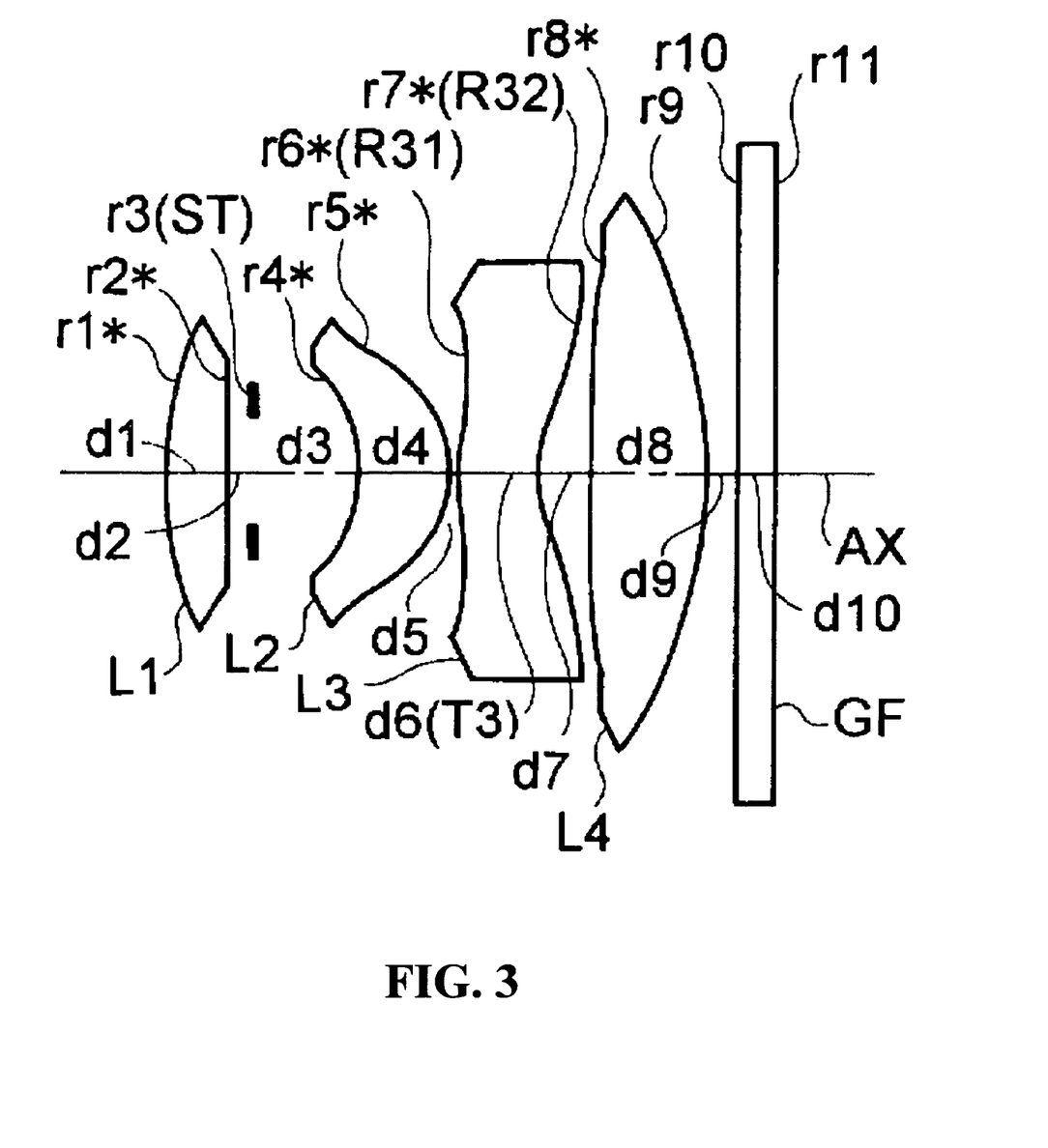
FIG. 3 is a lens configuration view of a third embodiment (example 3)
Figure 4:
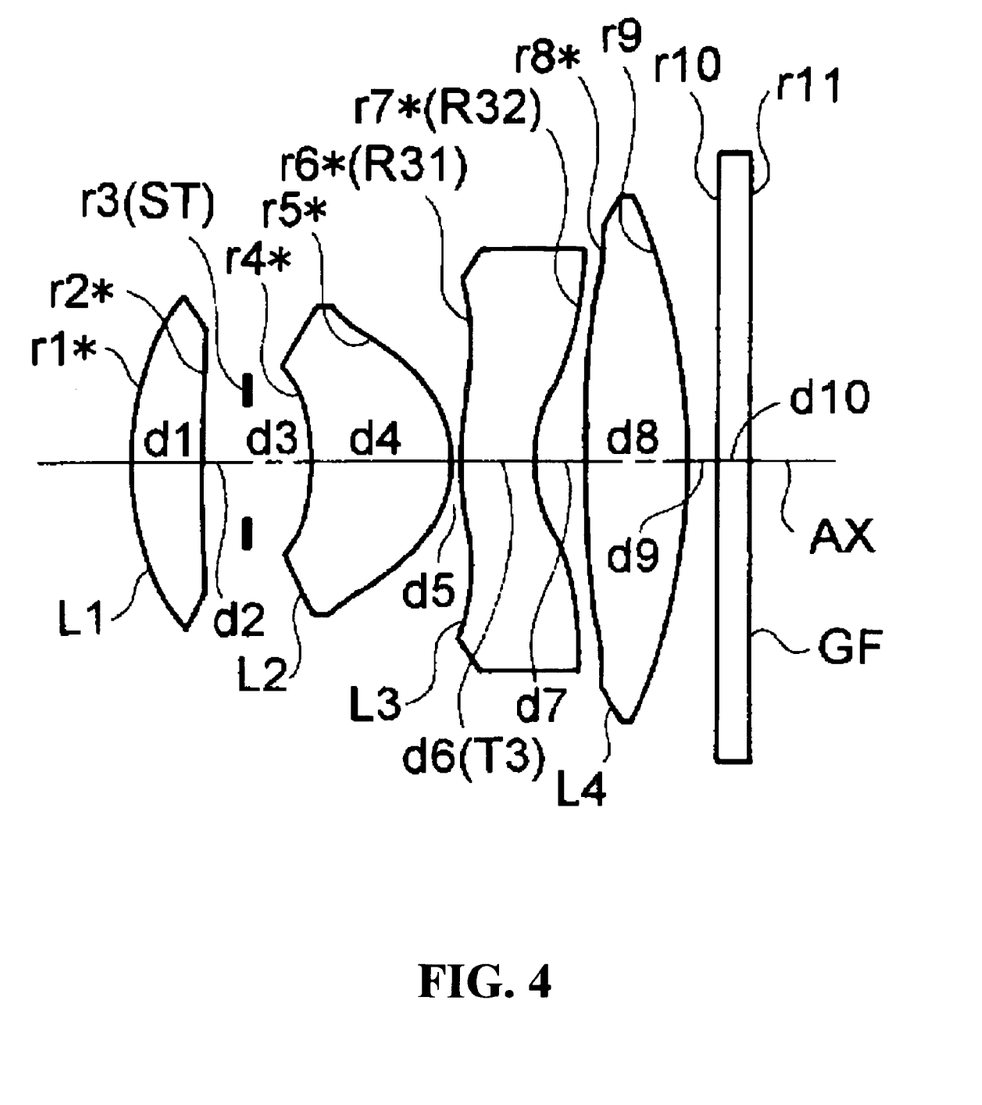
FIG. 4 is a lens configuration view of a fourth embodiment (example 4)
Figure 5:
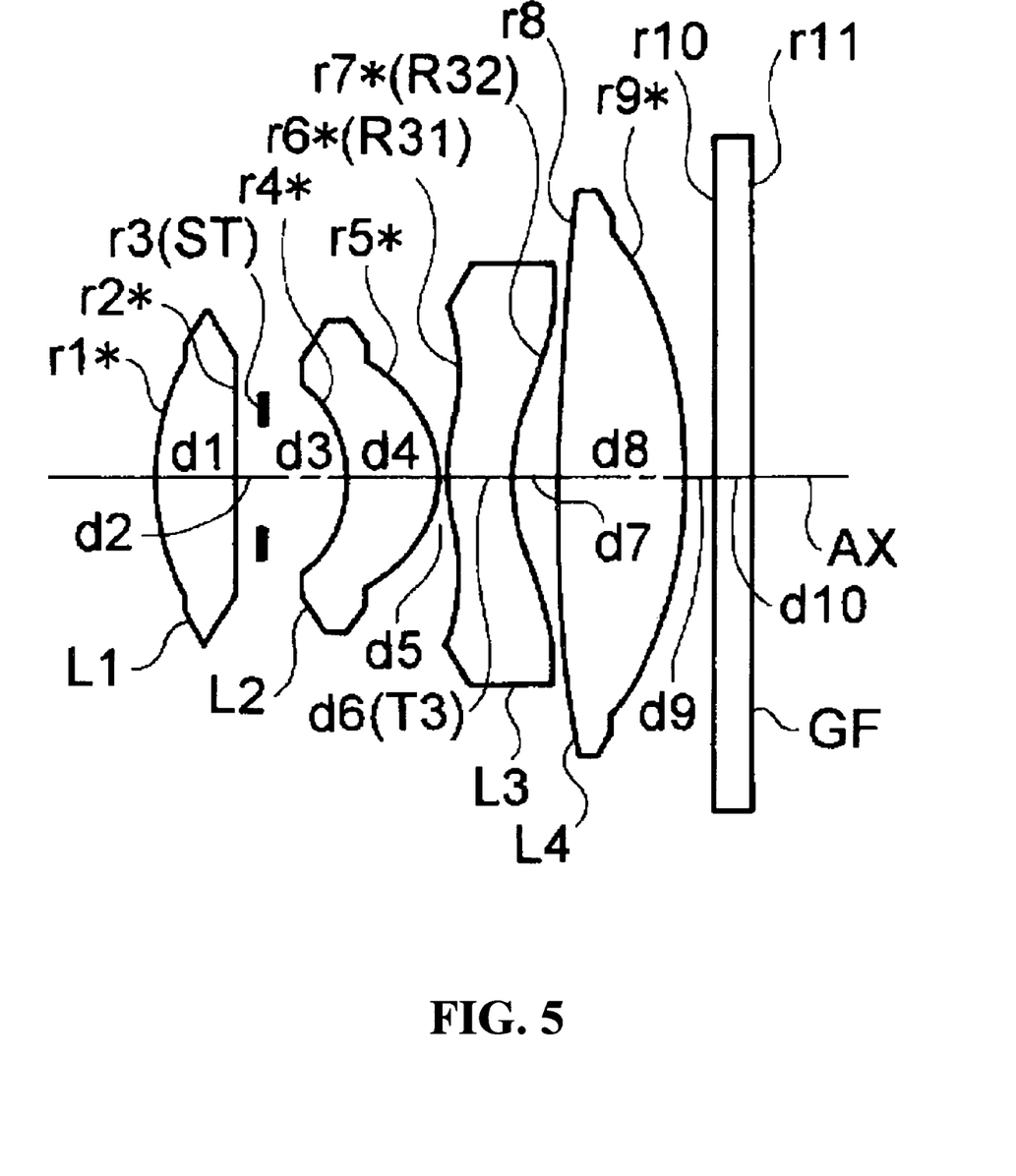
FIG. 5 is a lens configuration view of a fifth embodiment (example 5)

Referring to the accompanying drawings, preferred embodiments of the image pickup lens system according to the invention will be described below. FIGS. 1 to 5 show optical sections of lens configurations of a first to fifth embodiments respectively. The image pickup lens system of each embodiment is a single focus lens system for image pickup (for example, for the digital camera) which forms the optical image to the solid-state image pickup device (for example, CCD). The image pickup lens system of each embodiment is formed by four lenses of a positive first lens L1 whose convex surface is faced toward the object side, an aperture stop ST, a positive second lens L2 whose convex surface is faced toward the image surface side, a negative third lens L3 whose concave surface is faced toward the image surface side, and a positive fourth lens L4 whose convex surface is faced toward the image surface side in the order from an object side. A plane-parallel plate-shaped glass filter GF equal to an optical lowpass filter and the like is arranged on the image surface side of the image pickup lens system. In each lens configuration view (FIGS. 1 to 5), the surface to which ri (i=1, 2, 3, . . . ) is appended is an ith surface when counted from the object side. The surface to which the sign * is appended to ri is the aspheric surface. The axial surface interval to which di (i=1, 2, 3, . . . ) is appended is an ith axial surface interval when counted from the object side.

The lens configuration of each embodiment will be further described in detail. In the first, second, fourth, and fifth embodiments (FIGS. 1, 2, 4, and 5), the first lens L1 is the positive lens having a meniscus shape in which the convex surface of the lens is faced toward the object side, the second lens L2 is the positive lens having the meniscus shape in which the convex surface of the lens is faced toward the image surface side, the third lens L3 is the negative lens having the meniscus shape in which the concave surface of the lens is faced toward the image surface side, and the fourth lens L4 is the positive lens having a convex-convex shape. In the third embodiment (FIG. 3), the first lens L1 is the positive lens having the convex-convex shape, the second lens L2 is the positive lens having the meniscus shape in which the convex surface of the lens is faced toward the image surface side, the third lens L3 is the negative lens having the meniscus shape in which the concave surface of the lens is faced toward the image surface side, and the fourth lens L4 is the positive lens having the meniscus shape in which the convex surface of the lens is faced toward the image surface side. In each embodiment, the both surfaces of the first to third lenses L1 to L3 and one surface of the fourth lens L4 are formed in the aspheric surface.

As described in each embodiment, the lens total length can be shortened to makes the image pickup lens system compact by adopting the four-lens configuration in which the first lens has positive power (amount defined by an inverse number of the focal length). An exit pupil position can be kept far away from the image surface by arranging the power on the image surface side from the aperture stop in positive, negative, and positive forms. High optical performance can be obtained while an appropriate exit pupil position is secured by using the negative lens having the meniscus shape in which the concave surface is faced toward the image surface side as the third lens. Therefore, the high optical performance and the appropriate exit pupil position can be realized while the image pickup lens system can become compact by forming the image pickup lens system having the four-lens configuration by the positive first lens, the aperture stop, the positive second lens, the negative third lens whose concave surface is faced toward the image surface side, and the positive fourth lens. Conditions for achieving the higher optical performance and the like at the same time when these effects are obtained in well balance will be described below.

Conditional expressions in which the image pickup lens system of each embodiment should be satisfied, i.e. the conditional expressions which are desirably satisfied in the image pickup lens system of each embodiment will be described. However, it is not necessary that the image pickup lens system of each embodiment satisfies all the conditional expressions described below, and the corresponding operation and effect can be achieved when the image pickup lens system separately satisfies the individual conditional expression in accordance with the optical configuration. Needless to say, from the viewpoints of optical performance, miniaturization, manufacturing and assembly, and the like, it is desirable that the image pickup lens system satisfies the plurality of conditional expressions.

It is desirable that the image pickup lens system satisfies the following conditional expression (1):

$$0.05 < T3/f < 0.5 \tag{1}$$

where T3 is an axial thickness of the third lens and f is the focal length of the whole system.

The conditional expression (1) mainly defines a preferable condition range for balancing curvature of field and productivity of the lens with respect to the third lens. When T3/f exceeds the upper limit of the conditional expression (1), it is difficult to satisfactorily correct the curvature of field. On the contrary, when T3/f falls below the lower limit of the conditional expression (1), there is generated the problem that the thickness of the lens is too thin to produce.

It is desirable that the image pickup lens system satisfies the following conditional expression (1a).

$$0.10 < T3/f < 0.20 \tag{1a}$$

In the condition range defined by the conditional expression (1), the conditional expression (1a) defines the further preferable condition range based on the viewpoints of the curvature of field and the productivity of the lens.

It is desirable that the image pickup lens system satisfies the following conditional expression (2):

$$0.3 < f/f1 < 1.8 \tag{2}$$

where f is the focal length of the whole system and f1 is the focal length of the first lens.

The conditional expression (2) mainly defines the preferable condition range for balancing the total length and aberration with respect to the first lens. When f/f1 falls below the lower limit of the conditional expression (2), it leads to increase the total length while it is advantageous for the aberration correction. On the contrary, when f/f1 exceeds the upper limit of the conditional expression (2), although it is advantageous for the decrease in total length, aberration deterioration, in particular deteriorations of distortion aberration and the curvature of field become remarkable.

It is further desirable that the image pickup lens system satisfies the following conditional expression (2a).

$$0.5 < f/f1 < 1.0 \tag{2a}$$

In the condition range defined by the conditional expression (2), the conditional expression (2a) defines the further preferable condition range based on the viewpoints of the total length and the aberration.

It is desirable that the image pickup lens system satisfies the following conditional expression (3):

$$-1.6 < f/f3 < -0.4 \tag{3}$$

where f is the focal length of the whole system and f3 is the focal length of the third lens.

The conditional expression (3) mainly defines the preferable condition range for balancing the total length and the aberration with respect to the third lens. When f/f3 exceeds the upper limit of the conditional expression (3), it leads to increase the total length while it is advantageous for the aberration correction. On the contrary, when f/f3 falls below the lower limit of the conditional expression (3), although it is advantageous for the decrease in total length, the aberration, in particular the deteriorations of the distortion aberration and the curvature of field become remarkable.

It is further desirable that the image pickup lens system satisfies the following conditional expression (3a).

$$-1.2 < f/f3 < -0.6 \tag{3a}$$

In the condition range defined by the conditional expression (3), the conditional expression (3a) defines the further preferable condition range based on the viewpoints of the total length and the aberration.

It is desirable that the image pickup lens system satisfies the following conditional expression (4):

$$1 < (R31+R32)/(R31-R32) < 6 \tag{4}$$

where R31 is a curvature radius of the surface on the object side of the third lens and R32 is the curvature radius of the surface on the image surface side of the third lens.

The conditional expression (4) mainly defines the preferable condition range for balancing the exit pupil position and the distortion aberration. When (R31+R32)/(R31−R32) falls below the lower limit of the conditional expression (4), although it is advantageous for the exit pupil position, the deterioration of the distortion aberration becomes remarkable. On the contrary, when (R31+R32)/(R31−R32) exceeds the upper limit of the conditional expression (4), although it is advantageous for the distortion aberration, it is disadvantageous for the exit pupil position. Therefore, it is not preferable to the image pickup lens system for the solid-state image pickup device.

It is further desirable that the image pickup lens system satisfies the following conditional expression (4a).

$$2.0 < (R31+R32)/(R31-R32) < 4.0 \tag{4a}$$

In the condition range defined by the conditional expression (4), the conditional expression (4a) defines the further preferable condition range based on the viewpoints of the total length and the aberration.

As described in each embodiment, it is desirable to adopt the four-lens configuration in which the positive first lens whose convex surface is faced toward the object side, the aperture stop, the positive second lens whose convex surface is faced toward the image surface side, the negative third lens whose concave surface is faced toward the image surface side, and the positive fourth lens whose convex surface is faced toward the image surface side in the order from an object side. The adaptation of the lens configuration can optimize the balance among the good optical performance, the appropriate exit pupil position, the compact lens, and the like. Further as described in each embodiment, in all the lenses, it is desirable that at least one surface is formed in the aspheric surface. The provision of at least one aspheric surface in each of the first to fourth lenses has the large effect on the corrections of spherical aberration, coma aberration, and the distortion aberration.

The image pickup lens system of each embodiment is formed only by refraction type lenses which deflect the incident light beam by refraction action (namely, a type of lens in which the deflection is generated at an interface between media having the different refractive indices). However, the usable lens is not limited to the dioptric type lens. For example, it is possible to use a diffraction type lens which deflects the incident light beam by diffraction action, a diffraction-refraction hybrid type lens which deflects the incident light beam by combination of the diffraction action and the refraction action, a gradient refractive index type lens which deflects the incident light beam by a gradient of a refractive index in the medium, and the like. However, gradient refractive index type lens in which the refractive index is changed in the medium, because the complicated method of manufacturing the gradient refractive index type lens leads to an increase in cost, in the image pickup lens system according to the invention, it is desirable that to use a uniform raw material lens as the first to fourth lenses.

In addition to the aperture stop, it is possible to arrange a luminous flux control plate for cutting the unnecessary light and the like if necessary. In a plane having no optical power (for example, reflection plane, a refracting interface, and a diffraction plane), it is possible that a folded optical system is formed by arranging prisms such as a rectangular prism, mirrors such as a plane mirror, and the like in an optical path to fold the optical path in front of or at the back of the image pickup lens system or in the optical path. The folded optical system includes the optical system in which the luminous flux is reflected so that the optical axis is folded 90° or substantially 90°. It is possible to set the folded position as necessary, and a low profile or the miniaturization can be achieved by appropriately folding the optical path in the digital equipment such as the digital camera on which the image pickup lens system is mounted.

The image pickup lens system of each embodiment is suitable for the use of the small image pickup lens system for the digital equipment having an image input function (for example, camera cellular phone). An image pickup lens system apparatus which optically captures the image of the subject to output the electric signal can be formed by combining the image pickup lens system and the optical lowpass filter or the solid-state image pickup device. The image pickup lens system apparatus is a main constituent of the camera used for still image shooting and motion picture image shooting of the subject. For example, the image pickup lens system apparatus is formed by the image pickup lens system which forms the optical image of the object, the optical lowpass filter, an optical filter such as an infrared-cut filter, and the image pickup device which converts the optical image formed by the image pickup lens system into the electric signal.

For example, the camera includes the digital camera, the video camera, a monitor camera, a vehicle on-board camera, a visual telephone camera, a camera for door phone, and a camera which is built in or externally attached to a personal computer, a mobile computer, a cellular phone, PDA (Personal Digital Assistant), or these peripherals (mouse, scanner, printer and the like). Therefore, not only the camera can be formed by using the image pickup lens system apparatus, but also the camera function can be added by mounting the image pickup lens system apparatus on various types of the equipment.

The solid-state image pickup device such as CCD or a CMOS (Complementary Metal Oxide Semiconductor) sensor which includes a plurality of pixels is used as the image pickup device. The solid-state image pickup device converts the optical image formed by the image pickup lens system into the electric signal. In the optical image which should be formed by the image pickup lens system, spatial frequency characteristics are adjusted so that aliasing noise generated in converting the optical image into the electric signal is minimized by passing through the optical lowpass filter having predetermined cutoff frequency characteristics determined by a pixel pitch of the solid-state image pickup device. Digital image processing, image compression processing, or the like is performed, if necessary, to the signal generated by the solid-state image pickup device. Then, the signal is stored as the digital image signal in a memory (semiconductor memory, optical disk, and the like) or, in some cases the signal is transmitted to another apparatus through a cable or by converting the signal into an infrared signal.

The optical lowpass filter arranged between the final surface of the image pickup lens system and the solid-state image pickup device is formed by a glass filter GF in each embodiment. However, it is possible to use any optical lowpass filter in accordance with the digital input equipment in which the optical lowpass filter is used. For example, a birefringence type lowpass filter made of quartz whose predetermined crystal axis direction is controlled, a phase type lowpass filter which achieves the necessary optical cutoff frequency characteristics by the diffraction action, and the like can be applied to the optical lowpass filter.

As can be seen from the above descriptions, each of the embodiments described above or each of the examples mentioned later includes the following configurations. The configurations can realize the compact image pickup lens system apparatus having the good optical performance at low cost. The application of the image pickup lens system apparatus to the camera, the digital equipment, and the like can contribute to the high performance, the high functionality, the cost reduction, and the miniaturization.

(U1) An image pickup lens system apparatus comprising:
an image pickup lens system which forms an optical image;
an image pickup device which converts the optical image formed by the image pickup lens system into an electric signal;
wherein said image pickup lens system is formed by four lenses of a positive first lens, an aperture stop, a positive second lens, a negative third lens whose concave surface is faced toward an image surface side, and a positive fourth lens in the order from an object side, and said image pickup lens system satisfies at least one of the following conditional expressions (1), (1a), (2), (2a), (3), (3a), (4), and (4a).

(U2) An image pickup lens system apparatus comprising:
an image pickup lens system which forms an optical image;
an image pickup device which converts the optical image formed by the image pickup lens system into an electric signal;
wherein said image pickup lens system is formed by four lenses of a positive first lens whose convex surface is faced toward an object side, an aperture stop, a positive second lens whose convex surface is faced toward an image surface side, a negative third lens whose concave surface is faced toward the image surface side, and a positive fourth lens whose convex surface is faced toward the image surface side in the order from the object side, and said image pickup lens system satisfies at least one of the following conditional expressions (1), (1a), (2), (2a), (3), (3a), (4), and (4a).

(U3) An image pickup lens system apparatus according to (U1) or (U2), in which each of said first to fourth lenses has at least one aspheric surface.

(U4) An image pickup lens system apparatus as in any one of (U1), (U2) or (U3), wherein said first to fourth lenses are a uniform raw material lens.

(C1) A camera comprising an image pickup lens system apparatus as in any one of (U1), (U2), (U3) or (U4), wherein the camera is used for at least one of still image shooting and motion picture image shooting of a subject.

(C2) A camera according to (C1), wherein the camera is a digital camera, a video camera, or a camera which is built in or externally attached to a personal computer, a mobile computer, a cellular phone, PDA (Personal Digital Assistant), or these peripherals.

(D1) Digital equipment to which at least one of a function of shooting a still image and a function of shooting a motion picture image is added by including an image pickup lens system apparatus as in any one of (U1), (U2), (U3) or (U4).

(D2) Digital equipment according to (D1), wherein the digital equipment is a personal computer, a mobile computer, a cellular phone, PDA, or these peripherals.

The image pickup lens system of the invention will be described more specifically by citing construction data and the like. The following examples 1 to 5 is the numerical examples corresponding to the above-described first embodiment to fifth embodiment, and lens configuration views (FIGS. 1 to 5) showing the first to fifth embodiments represent the lens configurations of the corresponding examples 1 to 5 respectively.

In each piece of construction data of each example, ri (i=1, 2, 3, ... ) represents the curvature radius (mm) of an ith surface when the surfaces are counted from the object side, di (i=1, 2, 3, ... ) represents the ith axial surface interval (mm) when the axial surface intervals are counted from the object side, and Ni (i=1, 2, ... ) and (i (i=1, 2, ... ) represent the refractive index (Nd) for a d-line and Abbe number (vd) of the ith optical element when the optical elements are counted from the object side. The focal length (f, mm) of the total system and an F number (FNO) are shown with other pieces of data. Table 1 shows values corresponding to parameters defined by each conditional expression for each example.

The surface to which the sign * is appended to the curvature radius ri is the aspheric surface (the surface having a refraction action equivalent to a refracted optical surface in aspheric surface shape and the aspheric surface). The surface shape of the aspheric surface is defined by the following equation (AS). The aspheric surface data of each embodiment is shown with the other data.

$$X(H) = (C0 \cdot H^2)/\{1 + \sqrt{(1 - \epsilon \cdot C0^2 \cdot H^2)}\} + \Sigma(Aj \cdot H^j) \qquad (AS)$$

where X(H) is displacement (reference to surface top) in an optical axis AX direction at a position of a height H, H is the height in a direction perpendicular to the optical axis AX, C0 is a paraxial curvature (=1/ri), $\epsilon$ is a quadratic surface parameter, and Aj is j order aspheric coefficient (data is neglected in the case of Aj=0).

Figure 6A:
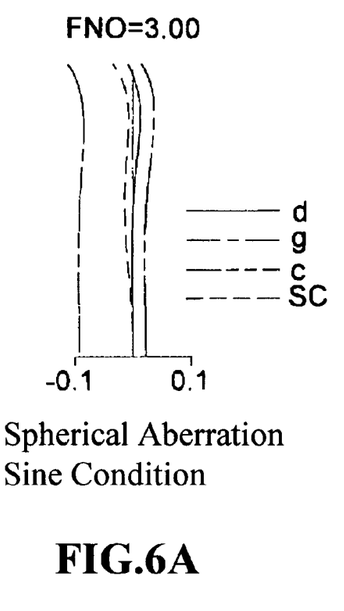
FIGS. 6A to 6C are an aberration view of the example 1.
Figure 6B:
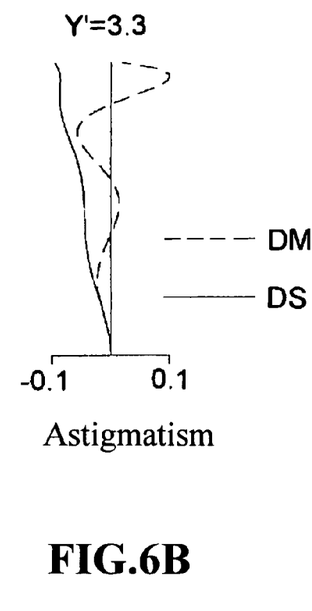
Figure 6C:
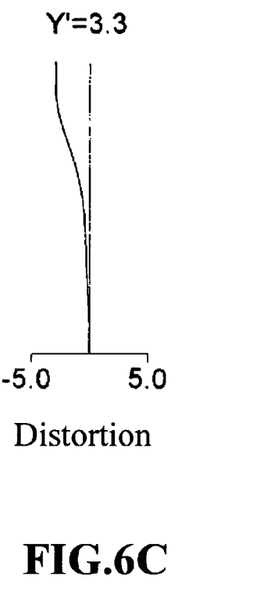
Figure 7A:
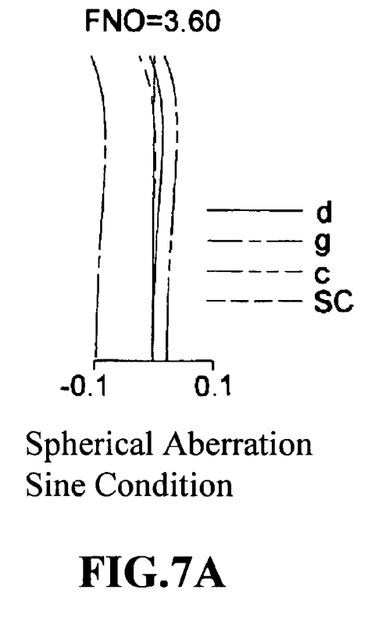
FIGS. 7A to 7C are an aberration view of the example 2.
Figure 7B:
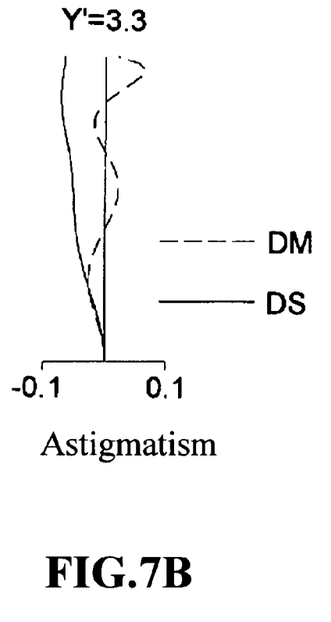
Figure 7C:
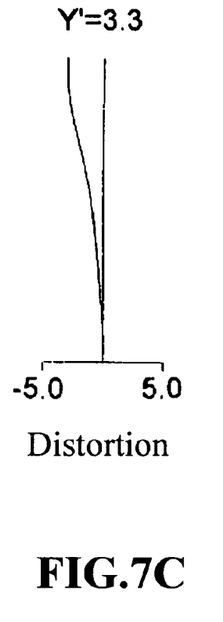
Figure 8A:
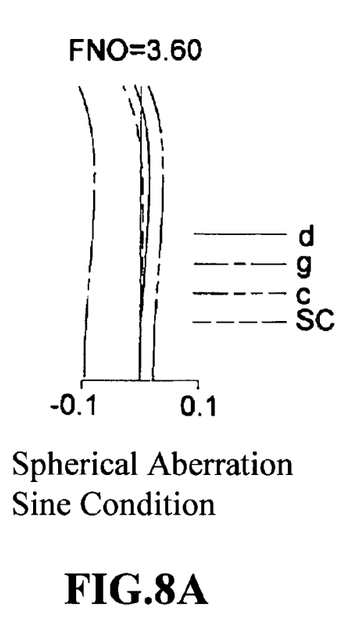
FIGS. 8A to 8C are an aberration view of the example 3.
Figure 8B:
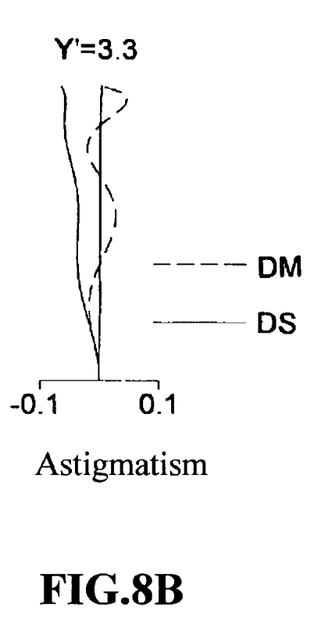
Figure 8C:
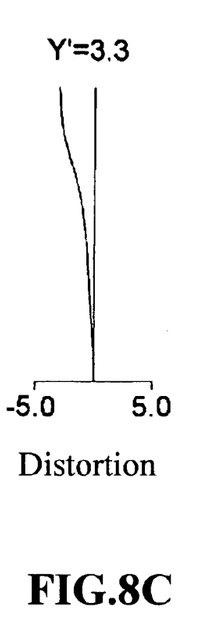
Figure 9A:
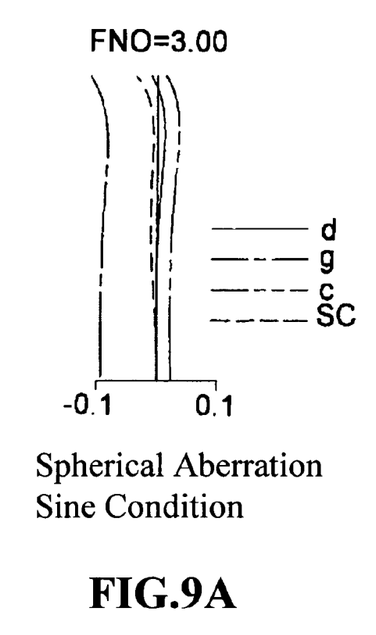
FIGS. 9A to 9C are an aberration view of the example 4.
Figure 9B:
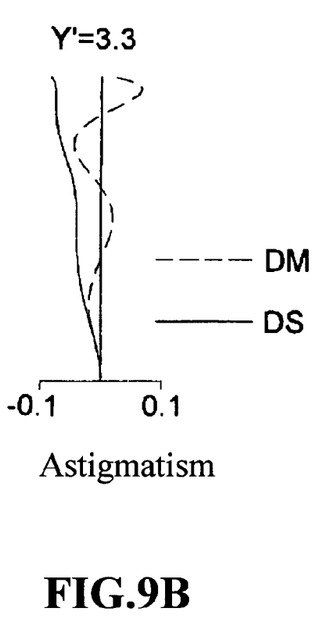
Figure 9C:
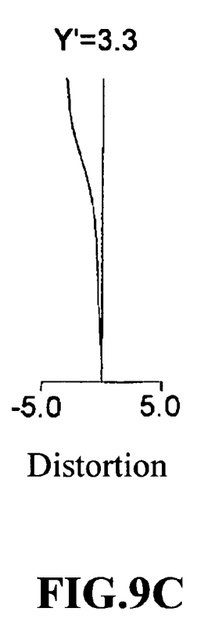
Figure 10A:
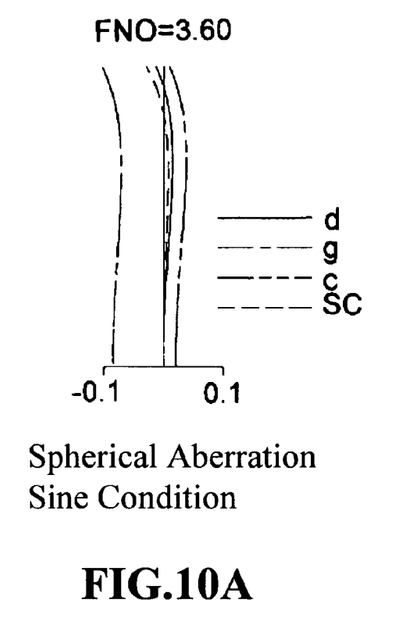
FIGS. 10A to 10C are an aberration view of the example 5.
Figure 10B:
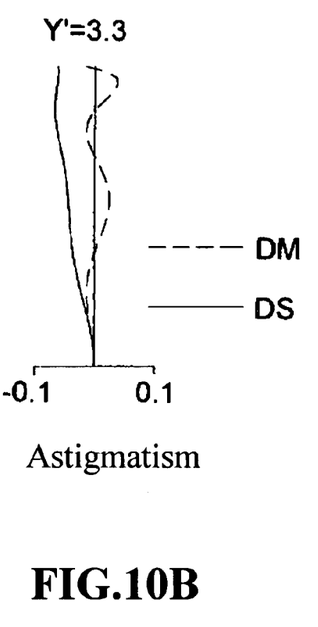
Figure 10C:
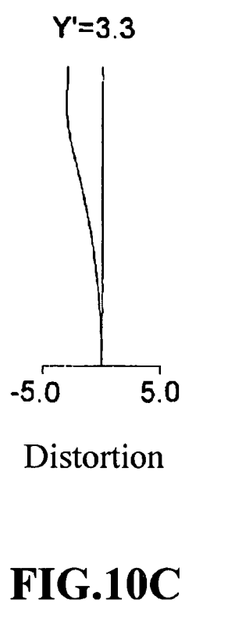

FIGS. 6 to 10 show aberration views of the examples 1 to 5 respectively. FIGS. 6A, 7A, 8A, 9A, and 10A show the spherical aberration, FIGS. 6B, 7B, 8B, 9B, and 10B show astigmatism, and FIGS. 6C, 7C, 8C, 9C, and 10C show the distortion aberration. FNO represents the F number and Y' represents a maximum image height (mm). In the spherical aberration view, a solid line d indicates the amount of spherical aberration (mm) for the d-line, a long and short dashed line g indicates the amount of spherical aberration (mm) for the g-line, a chain double-dashed line c indicates the amount of spherical aberration (mm) for the c-line, and a broken line SC indicates offense against the sine condition (mm). In the astigmatism view, a broken line DM indicates a meridional image surface (mm) and a solid line DS indicates a sagittal image surface (mm). In the distortion aberration view, the solid line indicates the distortion (%) for the d-line.

Example 1 f=5.795, FNO=3.0

| radius of curvature | axial distance | refractive index | Abbe number |
|---|---|---|---|
| r1* = 4.228 | d1 = 1.085 | N1 = 1.53048 | ν1 = 55.72(L1) |
| r2* = 47.641 | d2 = 0.750 | | |
| r3 = ∞(ST) | d3 = 0.864 | | |
| r4* = −2.537 | d4 = 2.024 | N2 = 1.53048 | ν2 = 55.72(L2) |
| r5* = −1.495 | d5 = 0.100 | | |
| r6* = 3.587(=R31) | d6 = 0.957(=T3) | N3 = 1.58340 | ν3 = 30.23(L3) |
| r7* = 1.531(=R32) | d7 = 0.737 | | |
| r8 = 38.075 | d8 = 1.393 | N4 = 1.53048 | ν4 = 55.72(L4) |
| r9* = −15.079 | d9 = 0.400 | | |
| r10 = ∞ | d10 = 0.500 | N5 = 1.51680 | ν5 = 64.20(GF) |
| r11 = ∞ | | | |

[aspheric surface data of 1st surface (r1)]
$\epsilon = 0.94665, A4 = 0.31003 \times 10^{-2}, A6 = -0.15830 \times 10^{-3}, A8 = 0.36453 \times 10^{-4}, A10 = -0.20033 \times 10^{-4}$
[aspheric surface data of 2nd surface (r2)]
$\epsilon = 0.16000 \times 10^2, A4 = 0.72239 \times 10^{-2}, A6 = -0.41496 \times 10^{-2}, A8 = 0.10963 \times 10^{-2}, A10 = -0.15453 \times 10^{-3}$
[aspheric surface data of 4th surface (r4)]
$\epsilon = 0.68121, A4 = -0.67380 \times 10^{-2}, A6 = -0.45004 \times 10^{-1}, A8 = 0.29782 \times 10^{-1}, A10 = -0.57264 \times 10^{-2}$
[aspheric surface data of 5th surface (r5)]
$\epsilon = 0.30436, A4 = 0.11711 \times 10^{-1}, A6 = -0.16024 \times 10^{-2}, A8 = -0.71809 \times 10^{-3}, A10 = 0.24004 \times 10^{-3}$
[aspheric surface data of 6th surface (r6)]
$\epsilon = 0.14059 \times 10, A4 = -0.60194 \times 10^{-1}, A6 = 0.97223 \times 10^{-2}, A8 = -0.94878 \times 10^{-3}, A10 = 0.31544 \times 10^{-4}$
[aspheric surface data of 7th surface (r7)]
$\epsilon = -0.28256 \times 10, A4 = -0.25885 \times 10^{-1}, A6 = 0.45484 \times 10^{-2}, A8 = -0.42517 \times 10^{-3}, A10 = 0.14656 \times 10^{-4}$
[aspheric surface data of 9th surface (r9)]
$\epsilon = 0.10000 \times 10, A4 = -0.37493 \times 10^{-2}, A6 = -0.15315 \times 10^{-3}, A8 = 0.12139 \times 10^{-5}, A10 = 0.20198 \times 10^{-5}$

Example 2 f=5.667, FNO=3.6

| radius of curvature | axial distance | refractive index | Abbe number |
|---|---|---|---|
| r1* = 3.863 | d1 = 0.941 | N1 = 1.53048 | ν1 = 55.72(L1) |
| r2* = 29.355 | d2 = 0.535 | | |
| r3 = ∞(ST) | d3 = 1.011 | | |
| r4* = −1.939 | d4 = 1.381 | N2 = 1.53048 | ν2 = 55.72(L2) |
| r5* = −1.381 | d5 = 0.100 | | |
| r6* = 3.199(=R31) | d6 = 0.859(=T3) | N3 = 1.58340 | ν3 = 30.23(L3) |
| r7* = 1.562(=R32) | d7 = 0.905 | | |
| r8 = 13.704 | d8 = 1.449 | N4 = 1.53048 | ν4 = 55.72(L4) |
| r9* = −31.652 | d9 = 0.400 | | |
| r10 = ∞ | d10 = 0.500 | N5 = 1.51680 | ν5 = 64.20(GF) |
| r11 = ∞ | | | |

[aspheric surface data of 1st surface (r1)]
$\epsilon = 0.94062, A4 = 0.32704 \times 10^{-2}, A6 = -0.94100 \times 10^{-4}, A8 = 0.97547 \times 10^{-4}, A10 = -0.81541 \times 10^{-4}$
[aspheric surface data of 2nd surface (r2)]
$\epsilon = 0.15824 \times 10^2, A4 = 0.77595 \times 10^{-2}, A6 = -0.46503 \times 10^{-2}, A8 = 0.97366 \times 10^{-3}, A10 = -0.18223 \times 10^{-3}$
[aspheric surface data of 4th surface (r4)]
$\epsilon = 0.10419 \times 10, A4 = -0.70554 \times 10^{-2}, A6 = -0.38890 \times 10^{-1}, A8 = 0.27836 \times 10^{-1}, A10 = -0.37367 \times 10^{-2}$
[aspheric surface data of 5th surface (r5)]
$\epsilon = 0.32762, A4 = 0.99396 \times 10^{-2}, A6 = -0.48551 \times 10^{-2}, A8 = -0.50507 \times 10^{-3}, A10 = 0.52062 \times 10^{-3}$
[aspheric surface data of 6th surface (r6)]
$\epsilon = 0.12322 \times 10, A4 = -0.62270 \times 10^{-1}, A6 = 0.10063 \times 10^{-1}, A8 = -0.95558 \times 10^{-3}, A10 = -0.62767 \times 10^{-5}$
[aspheric surface data of 7th surface (r7)]
$\epsilon = -0.29187 \times 10, A4 = -0.23696 \times 10^{-1}, A6 = 0.43005 \times 10^{-2}, A8 = -0.45631 \times 10^{-3}, A10 = 0.15186 \times 10^{-4}$
[aspheric surface data of 9th surface (r9)]
$\epsilon = 0.10000 \times 10, A4 = -0.56179 \times 10^{-2}, A6 = 0.68258 \times 10^{-4}, A8 = 0.20662 \times 10^{-5}, A10 = 0.14527 \times 10^{-5}$

Example 3 f=5.761, FNO=3.6

| radius of curvature | axial distance | refractive index | Abbe number |
|---|---|---|---|
| r1* = 4.495 | d1 = 0.859 | N1 = 1.53048 | ν1 = 55.72(L1) |
| r2* = −129.619 | d2 = 0.350 | | |
| r3 = ∞(ST) | d3 = 1.387 | | |
| r4* = −1.833 | d4 = 1.179 | N2 = 1.53048 | ν2 = 55.72(L2) |
| r5* = −1.286 | d5 = 0.100 | | |
| r6* = 3.814(=R31) | d6 = 1.065(=T3) | N3 = 1.58340 | ν3 = 30.23(L3) |
| r7* = 1.536(=R32) | d7 = 0.638 | | |
| r8* = −54.069 | d8 = 1.602 | N4 = 1.53048 | ν4 = 55.72(L4) |
| r9 = −6.406 | d9 = 0.400 | | |
| r10 = ∞ | d10 = 0.500 | N5 = 1.51680 | ν5 = 64.20(GF) |
| r11 = ∞ | | | |

[aspheric surface data of 1st surface (r1)]
$\epsilon = 0.19577, A4 = 0.89873 \times 10^{-3}, A6 = 0.47746 \times 10^{-3}, A8 = -0.29347 \times 10^{-4}, A10 = -0.13868 \times 10^{-4}$
[aspheric surface data of 2nd surface (r2)]
$\epsilon = -0.14000 \times 10^2, A4 = 0.50318 \times 10^2, A6 = -0.34046 \times 10^{-2}, A8 = 0.22696 \times 10^{-2}, A10 = -0.62563 \times 10^{-3}$
[aspheric surface data of 4th surface (r4)]
$\epsilon = 0.86631, A4 = 0.86947 \times 10^{-2}, A6 = -0.37774 \times 10^{-1}, A8 = 0.22545 \times 10^{-1}, A10 = -0.24441 \times 10^{-2}$
[aspheric surface data of 5th surface (r5)]
$\epsilon = 0.28368, A4 = 0.17020 \times 10^{-1}, A6 = -0.71164 \times 10^{-2}, A8 = -0.24640 \times 10^{-3}, A10 = 0.72485 \times 10^{-3}$
[aspheric surface data of 6th surface (r6)]
$\epsilon = 0.52731, A4 = -0.62252 \times 10^{-1}, A6 = 0.10816 \times 10^{-1}, A8 = -0.86826 \times 10^{-3}, A10 = -0.13979 \times 10^{-4}$
[aspheric surface data of 7th surface (r7)]
$\epsilon = -0.34845 \times 10, A4 = -0.24130 \times 10^{-1}, A6 = 0.48487 \times 10^{-2}, A8 = -0.44028 \times 10^{-3}, A10 = 0.88715 \times 10^{-5}$
[aspheric surface data of 8th surface (r8)]
$\epsilon = 0.10000 \times 10, A4 = 0.71307 \times 10^{-2}, A6 = 0.73274 \times 10^{-4}, A8 = -0.24795 \times 10^{-4}, A10 = -0.41482 \times 10^{-5}$

Example 4 f=5.782, FNO=3.0

| radius of curvature | axial distance | refractive index | Abbe number |
|---|---|---|---|
| r1* = 4.257 | d1 = 1.018 | N1 = 1.53048 | ν1 = 55.72(L1) |
| r2* = 44.713 | d2 = 0.638 | | |
| r3 = ∞(ST) | d3 = 0.967 | | |
| r4* = −2.442 | d4 = 1.924 | N2 = 1.53048 | ν2 = 55.72(L2) |
| r5* = −1.486 | d5 = 0.100 | | |
| r6* = 3.620(=R31) | d6 = 1.054(=T3) | N3 = 1.58340 | ν3 = 30.23(L3) |
| r7* = 1.482(=R32) | d7 = 0.693 | | |
| r8* = 71.150 | d8 = 1.517 | N4 = 1.53048 | ν4 = 55.72(L4) |
| r9 = −8.408 | d9 = 0.400 | | |
| r10 = ∞ | d10 = 0.500 | N5 = 1.51680 | ν5 = 64.20(GF) |
| r11 = ∞ | | | |

[aspheric surface data of 1st surface (r1)]
$\epsilon = 0.88347, A4 = 0.26435 \times 10^{-2}, A6 = -0.53501 \times 10^{-5}$,
$A8 = 0.73239 \times 10^{-4}, A10 = -0.21890 \times 10^{-4}$
[aspheric surface data of 2nd surface (r2)]
$\epsilon = 0.15932 \times 10^{-2}, A4 = 0.65600 \times 10^{-2}, A6 = -0.37428 \times 10^{-2}$,
$A8 = 0.13998 \times 10^{-2}, A10 = -0.25860 \times 10^{-3}$
[aspheric surface data of 4th surface (r4)]
$\epsilon = 0.47665, A4 = -0.39248 \times 10^{-2}, A6 = -0.43458 \times 10^{-1}$,
$A8 = 0.27114 \times 10^{-1}, A10 = -0.52933 \times 10^{-2}$
[aspheric surface data of 5th surface (r5)]
$\epsilon = 0.30580, A4 = 0.11819 \times 10^{-1}, A6 = -0.15533 \times 10^{-2}$,
$A8 = -0.63269 \times 10^{-3}, A10 = 0.22613 \times 10^{-3}$
[aspheric surface data of 6th surface (r6)]
$\epsilon = 0.14659 \times 10, A4 = -0.59957 \times 10^{-1}, A6 = 0.98108 \times 10^{-2}$,
$A8 = -0.94458 \times 10^{-3}, A10 = 0.31134 \times 10^{-4}$
[aspheric surface data of 7th surface (r7)]
$\epsilon = -0.27322 \times 10, A4 = -0.23868 \times 10^{-1}, A6 = 0.46734 \times 10^{-2}$,
$A8 = -0.43230 \times 10^{-3}, A10 = 0.12309 \times 10^{-4}$
[aspheric surface data of 8th surface (r8)]
$\epsilon = 0.10000 \times 10, A4 = 0.50993 \times 10^{-2}, A6 = 0.80952 \times 10^{-4}$,
$A8 = -0.12589 \times 10^{-4}, A10 = -0.33697 \times 10^{-5}$

Example 5 f=5.667, FNO=3.6

| radius of curvature | axial distance | refractive index | Abbe number |
|---|---|---|---|
| r1* = 3.481 | d1 = 0.964 | N1 = 1.58913 | ν1 = 61.11(L1) |
| r2* = 17.870 | d2 = 0.377 | | |
| r3 = ∞(ST) | d3 = 1.102 | | |
| r4* = −1.671 | d4 = 1.168 | N2 = 1.53048 | ν2 = 55.72(L2) |
| r5* = −1.280 | d5 = 0.100 | | |
| r6* = 3.407(=R31) | d6 = 0.787(=T3) | N3 = 1.58340 | ν3 = 30.23(L3) |
| r7* = 1.618(=R32) | d7 = 0.627 | | |
| r8 = 26.908 | d8 = 1.647 | N4 = 1.53048 | ν4 = 55.72(L4) |
| r9* = −14.969 | d9 = 0.400 | | |
| r10 = ∞ | d10 = 0.500 | N5 = 1.51680 | ν5 = 64.20(GF) |
| r11 = ∞ | | | |

[aspheric surface data of 1st surface (r1)]
$\epsilon = 0.65033, A4 = 0.23502 \times 10^{-2}, A6 = -0.38405 \times 10^{-3}$,
$A8 = -0.41121 \times 10^{-4}, A10 = -0.10998 \times 10^{-3}$
[aspheric surface data of 2nd surface (r2)]
$\epsilon = 0.16000 \times 102, A4 = 0.25250 \times 10^{-2}, A6 = -0.61138 \times 10^{-2}$,
$A8 = 0.15005 \times 10^{-2}, A10 = -0.28202 \times 10^{-3}$
[aspheric surface data of 4th surface (r4)]
$\epsilon = 0.13461 \times 10, A4 = -0.85809 \times 10^{-2}, A6 = -0.30450 \times 10^{-1}$,
$A8 = 0.23834 \times 10^{-1}, A10 = 0.22544 \times 10^{-2}$
[aspheric surface data of 5th surface (r5)]
$\epsilon = 0.31415, A4 = 0.11105 \times 10^{-1}, A6 = -0.90117 \times 10^{-2}$,
$A8 = -0.10382 \times 10^{-3}, A10 = 0.11266 \times 10^{-2}$
[aspheric surface data of 6th surface (r6)]
$\epsilon = 0.76798, A4 = -0.63873 \times 10^{-1}, A6 = 0.10631 \times 10^{-1}$,
$A8 = -0.88745 \times 10^{-3}, A10 = -0.23609 \times 10^{-4}$
[aspheric surface data of 7th surface (r7)]
$\epsilon = -0.32832 \times 10, A4 = -0.23920 \times 10^{-1}, A6 = 0.43099 \times 10^{-2}$,
$A8 = -0.45113 \times 10^{-3}, A10 = 0.16578 \times 10^{-4}$
[aspheric surface data of 9th surface (r9)]
$\epsilon = 0.10000 \times 10, A4 = -0.10099 \times 10^{-1}, A6 = 0.17614 \times 10^{-3}$,
$A8 = 0.12723 \times 10^{-4}, A10 = 0.78753 \times 10^{-6}$

TABLE 1

| | Expression | | | |
|---|---|---|---|---|
| | (1), (1a) T3/f | (2), (2a) f/f1 | (3), (3a) f/f3 | (4), (4a) (R31 + R32)/ (R31 − R32) |
| Example 1 | 0.165 | 0.668 | −1.048 | 2.489 |
| Example 2 | 0.152 | 0.685 | −0.874 | 2.908 |
| Example 3 | 0.185 | 0.702 | −1.082 | 2.349 |
| Example 4 | 0.182 | 0.658 | −1.100 | 2.386 |
| Example 5 | 0.139 | 0.791 | −0.899 | 2.809 |

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image pickup lens system comprising, from an object side:

a positive first lens;

an aperture stop;

a positive second lens;

a negative third lens whose concave surface is faced toward an image surface side;

and a positive fourth lens, wherein the image pickup lens system satisfies the following conditional expressions (1), (3):

$$0.05 < T3/f < 0.5 \quad (1)$$

$$-1.6 < f/f3 < -0.4 \quad (3)$$

where T3 is an axial thickness of the third lens, f is the focal length of the image pickup lens system and f3 is the focal length of the third lens.

2. An image pickup lens system according to claim 1, wherein the first lens faces a convex surface toward the object side.

3. An image pickup lens system according to claim 1, wherein the second lens faces a convex surface toward the image side.

4. An image pickup lens system according to claim 1, wherein the fourth lens faces a convex surface toward the image.

5. An image pickup lens system according to claim 1, wherein the first lens faces a convex surface toward the object side, the second lens faces a convex surface toward the image side, and the fourth lens faces a convex surface toward the image.

6. An image pickup lens system according to claim 1, wherein the image pickup lens system satisfies the following conditional expression (2):

$$0.3 < f/f1 < 1.8 \quad (2)$$

where f is the focal length of the whole system and f1 is the focal length of the first lens.

7. An image pickup lens system according to claim 1, further comprising an image pickup device which converts the optical image formed by the image pickup lens system into an electric signal.

8. An image pickup lens system according to claim 1, wherein each of said first to fourth lenses has at least one aspheric surface.

9. An image pickup lens system according to claim 1, wherein said first to fourth lenses are made from uniform raw material.

10. An image pickup lens system comprising, from an object side:
a positive first lens;
an aperture stop;
a positive second lens;
a negative third lens whose concave surface is faced toward an image surface side; and
a positive fourth lens,
wherein the image pickup lens system satisfies the following conditional expressions (1), (4):

$$0.05 < T3/f < 0.5 \tag{1}$$

$$1 < (R31+R32)/(R31-R32) < 6 \tag{4}$$

where T3 is an axial thickness of the third lens and f is a focal length of the image pickup lens system, R31 is a curvature radius of the surface on the object side of the third lens and R32 is the curvature radius of the surface on the image surface side of the third lens.

11. An image pickup lens system according to claim 10 wherein the first lens faces a convex surface toward the object side.

12. An image pickup lens system according to claim 10 wherein the second lens faces a convex surface toward the image side.

13. An image pickup lens system according to claim 10 wherein the fourth lens faces a convex surface toward the image.

14. An image pickup lens system according to claim 10, wherein the first lens faces a convex surface toward the object side, the second lens faces a convex surface toward the image side, and the fourth lens faces a convex surface toward the image.

15. An image pickup lens system according to claim 10, wherein the image pickup lens system satisfies the following conditional expression (2):

$$0.3 < f/f1 < 1.8 \tag{2}$$

where f is the focal length of the whole system and f1 is the focal length of the first lens.

16. An image pickup lens system according to claim 10, further comprising an image pickup device which converts the optical image formed by the image pickup lens system into an electric signal.

17. An image pickup lens system according to claim 10, wherein each of said first to fourth lenses has at least one aspheric surface.

18. An image pickup lens system according to claim 10, wherein said first to fourth lenses are made from uniform raw material.

* * * * *

UNITED STATES PATENT AND TRADEMARK OFFICE
CERTIFICATE OF CORRECTION

PATENT NO. : 7,474,479 B2  Page 1 of 1
APPLICATION NO. : 10/999565
DATED : January 6, 2009
INVENTOR(S) : Masashi Isono It is certified that error appears in the above-identified patent and that said Letters Patent is hereby corrected as shown below:

Column 13:
line 23, delete "$1(R31+R32)/(R31-R32) < 6$" (4)" and
  insert -- $1 < (R31+R32)/(R31-R32 < 6$ (4) --.

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,474,479 B2 | Page 1 of 1 |
| APPLICATION NO. | : 10/999565 | |
| DATED | : January 6, 2009 | |
| INVENTOR(S) | : Masashi Isono | |

It is certified that error appears in the above-identified patent and that said Letters Patent is hereby corrected as shown below:

Column 13:
line 23, delete "$1(R31+R32)/(R31-R32) < 6$     (4)" and
    insert -- $1 < (R31+R32)/(R31-R32) < 6$   (4) --.

This certificate supersedes the Certificate of Correction issued March 3, 2009.

Signed and Sealed this

Eighth Day of June, 2010

David J. Kappos
*Director of the United States Patent and Trademark Office*